July 31, 1951     E. PICK     2,562,735
LIQUID TREATING APPARATUS
Filed Nov. 15, 1947
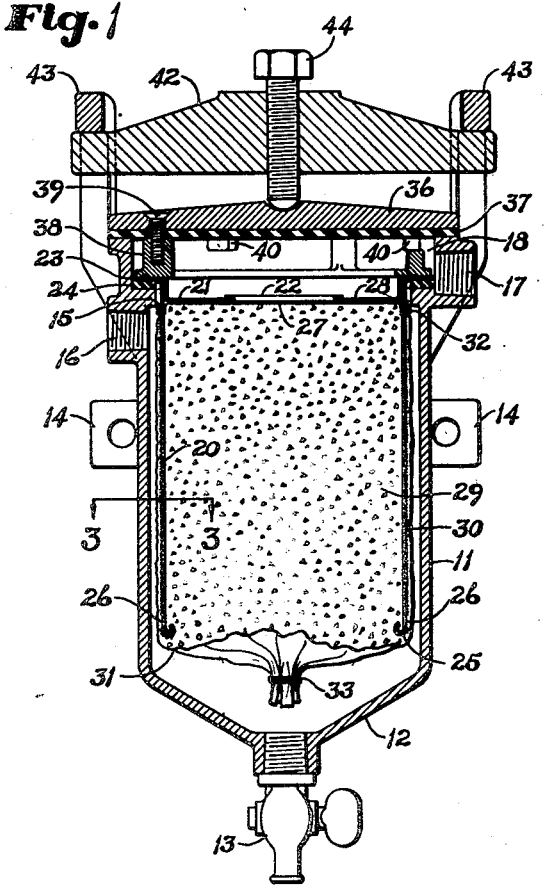
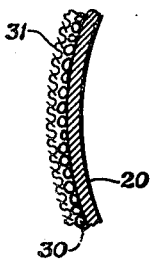
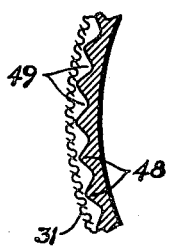
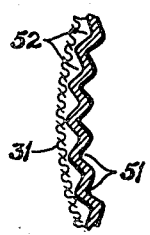
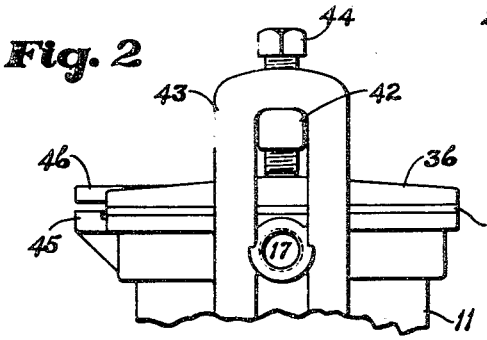
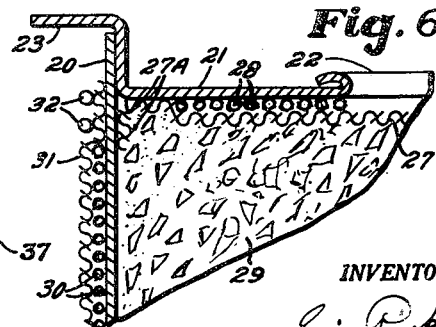
INVENTOR:

Patented July 31, 1951

2,562,735

UNITED STATES PATENT OFFICE 2,562,735

LIQUID TREATING APPARATUS

Eric Pick, East Rockaway, N. Y., assignor to The Permutit Company, New York, N. Y., a corporation of Delaware Application November 15, 1947, Serial No. 786,229

7 Claims. (Cl. 210—131)

This invention relates to liquid treating apparatus; and it comprises a container with an expendable and readily replaceable liquid treatment cartridge, all as more fully described hereinafter and as claimed.

In recent years, many devices have come into wide use in which water supplied under pressure is modified for beverage use, such as automatic drinking water coolers and apparatus which dispense soft drinks, coffee, etc. Such devices are usually connected to a supply of water under pressure from which they draw according to the demand placed upon them. The available water supply frequently is not of a wholly satisfactory quality; it may, for instance, contain suspended matter (turbidity), dissolved organic substances (color), and excess chlorine remaining from a previous sterilization treatment. Such substances impair both the appearance and the taste and it is, therefore, desirable to remove them.

The objects of this invention are to provide an apparatus for removing suspended and certain dissolved substances from a liquid, and to provide for such apparatus a liquid treatment cartridge which is simple, efficient and readily replaced when it has reached the end of its usefulness.

The manner in which these objects are achieved is shown in the appended drawings in which:

Fig. 1 is a vertical view, partly in section, through an apparatus in accordance with my invention;

Fig. 2 is a side view of the upper portion of the apparatus shown in Fig. 1;

Fig. 3 is an enlarged fragmentary section through the cartridge along line 3—3 of Fig. 1;

Figs. 4 and 5 are views of modified cartridges, similar to Fig. 3; and

Fig. 6 is an enlarged fragmentary section through the upper portion of the cartridge in the plane of Fig. 1.

Like numerals refer to like parts throughout the several views.

Referring now to Fig. 1, my apparatus comprises a cylindrical container 11 with a conical bottom 12 provided with a drain cock 13. The container 11 has two brackets 14 for attaching the apparatus to a wall or other suitable support. Near the upper open end of the container 11 there is an inwardly extending shoulder 15, and the container is provided with an inlet 16 for liquid to be treated below said shoulder 15 and an outlet 17 for treated liquid above said shoulder 15. Above the shoulder 15 the diameter of the container is advantageously somewhat enlarged as shown at 18.

The liquid treatment cartridge comprises a cylindrical container 20 with a top 21 having one or a plurality of openings 22 therein. The top 21 of the container has an outwardly extending flange 23 resting on a gasket 24, which in turn, rests on the shoulder 15. The lower edge of the container 20 is rolled inwardly, as shown at 25, forming a pervious bottom, and a plurality of uniformly spaced ports 26 are provided adjacent to the rolled edge 25. Within the container 20 and fitted to its top 21 is a round foraminous element, such as a piece of filter cloth 27 cemented in place along its periphery at the areas indicated by the numeral 27A in Fig. 6. Advantageously fine gravel 28 is cemented to a position of the underside of the top 21 by means of water-proof cement (see Fig. 6) so as to partially space the filter cloth 27 from the top 21 and form drainage means between the impervious portion of the top 21 and the foraminous element 27, said drainage means communicating with the opening or openings 22. The inside of the container 20 is filled with granular activated carbon 29. To the outside of the cylindrical impervious container 20 is cemented a single layer of fine gravel 30 of about $\frac{1}{16}$" in diameter. Over the container 20 and the gravel 30 is fitted a tubular filter cloth 31 which is tied to the container at the top above the gravel 30 by means of a wire 32, as shown in Fig. 6. Other suitable clamping means may, of course, be employed. The lower portion of the tubular filter cloth 31 extends over the bottom portion 25 and is tied closed by means of a wire loop 33, thus retaining the activated carbon 29 within the cartridge.

The open top of the container 11 is closed by a cover 36 to which is fitted a gasket 37 and an annular sleeve 38, held to the cover 36 by screws 39 and provided with passages 40. The cover 36 and gasket 37 are held pressure-tight against the open top of the container 11 by means of a screw 44 in a yoke 42 fitted into two U-shaped brackets 43 integral with the container 11. Tightening of the screw 44 not only forces the cover 36 with gasket 37 against the open top of the container 11, but simultaneously presses, through the sleeve 38, the flange 23 against the gasket 24 and the latter against the shoulder 15 in pressure-tight relationship.

In operation, the liquid to be treated, such as water supplying a drinking water cooler, enters through the inlet 16 under pressure, filling the container 11 below the shoulder 15, and then passes through the tubular filter cloth 31, whereby suspended impurities are filtered out. A portion of the water flows through the vertical portion of the filter cloth 31 and then passes downwardly through the drainage means formed between the impervious container 20 and the filter cloth 31, the gravel 30 acting as spacing means. The water flows through the interstices between the grains of gravel 30 until it is able to enter the inside of the container 20 around the bottom portion 25 or through the ports 26. The remaining portion of the water flows upwardly through the tied up bottom portion of the tubular filter cloth 31. Both these portions thus flow to the lower open end of the container 20 and then pass upwardly through the entire bed of granular activated carbon 29, whereby certain substances imparting taste and color to the water, such as excess chlorine, phenol compounds, humic substances etc. are removed in a well known manner. From the activated carbon 29, the water flows through the foraminous element 27 and the opening or openings 22 into the space within the sleeve 38, thence through the passages 40 into the space 18, and finally through the outlet 17 to the point of use.

After a period of use, the filter cloth 31 will become coated with impurities filtered from the water and the capacity of the activated carbon 29 to remove objectionable matter from the water may become impaired or exhausted. It is, therefore, desirable to replace the cartridge at periodic intervals. In order to effect such replacement, a valve (not shown) in the supply pipe connected to inlet 16 is closed and the drain cock 13 is opened. Then the screw 44 is loosened, whereupon the yoke 42 may be withdrawn from under the brackets 43. Next, the cover 36, with the attached sleeve 38, is removed. If the gasket 37 should stick to the top of the container 11, it may be pried off by the insertion of a screw driver or other suitable tool between a lateral projection 45 on the container 11 and a second similar projection 46 on the cover 36 (see Fig. 2). As soon as the cover 36 is taken off, the vent thus provided permits some water to drain out through the cock 13. It is only necessary to remove a relatively small quantity of water by such draining operation in order to prevent spilling of water during withdrawal of the old cartridge and insertion of a new one. The drain cock 13 is, therefore, closed as soon as the liquid level within the container 11 has been lowered to the vicinity of the shoulder 15.

The sleeve 38 having been removed with the cover 36, the old cartridge may readily be lifted from the container 11 and a replacement cartridge inserted in its stead so that its flange 23 comes to rest on the gasket 24. The cover 36 is then replaced, the yoke 42 inserted into the brackets 43 and the screw 44 tightened. Then, as soon as the water supply to inlet 16 is turned on again the apparatus will continue to perform its liquid treating function.

The operations required for replacing the cartridge are simple and can be carried out in but a few minutes. The used cartridge can, of course, be taken apart, cleaned and reassembled, but as a rule it is more economical to dispose of it since the cost of a new cartridge compares favorably with the cost of reconditioning a used one.

Figs. 4 and 5 show modifications of the cartridge construction. The modification of Fig. 4 is particularly suitable for producing the container 20 from molded plastic or as a die-casting. The outside of the container wall has straight or spiral flutes 48 which act as spacing means for part of the filter cloth 31 and thus provide drainage means in the form of shallow flow passages 49 through which the liquid that has passed through the filter cloth 31 is guided downwardly to the lower end of the container 20 to then pass upwardly through the activated carbon as previously described.

The modification shown in Fig. 5 is particularly suitable for sheet-metal construction. There the flutes 51 consist of corrugations, and they act as spacing means and provide drainage means in the form of shallow flow passages 52 functioning in the same manner as the passages described in connection with Figs. 3 and 4.

The container 20 of Figs. 1 to 3 and 6 is advantageously produced of thin sheet-metal such as that used in so-called tin cans, except that it need not be coated with tin, the metal being better protected against corrosion by a suitable varnish or other coating.

The layer of gravel 30 on the container 20 in the apparatus shown in Figs. 1 and 3, and the flutes 48 and 51 in the modifications shown in Figs. 4 and 5, respectively, end just below the place where the filter element 31 is fastened by means of the wire 32, as shown in Fig. 6, in order to prevent the direct entrance of any unfiltered water into the drainage means formed by the gravel or flutes.

A cartridge 4 inches in diameter and 5½ inches long has been found satisfactory for supplying water to a drinking water cooler or a soft drink dispenser at a rate of about one-half gallon per minute. A cartridge of such size, made in accordance with my invention, presents a relatively large filtration area of about 72 square inches to the liquid, consisting of the bottom area of about 12 square inches and about 60 square inches of filter cloth wrapped around the container 20. Thus, the pressure loss entailed in filtration is kept down and a relatively long life is insured. Yet, all the water entering through the filter cloth is guided to the lower end of the cartridge and passed upwardly through the entire bed of activated carbon without bypassing any portion of it, thus insuring efficiency of the activated carbon treatment. If desired, the bottom of the container 20 may be closed by a solid plate or by making the filter cloth 31 impervious to the flow of liquid across the bottom area.

If desired, granular cation exchange material or a combination of cation and anion exchange materials may be employed in place of or in addition to the activated carbon within the container 20 to provide softening or demineralization of the water instead of or in addition to the treatment described above. It is important, however, that the entire space within the container 20 between the foraminous element 27 and the bottom portion of the filter cloth 31 is filled completely with granular material; if that is not the case the material shifts every time the flow of liquid is started and stopped with the result that some turbidity appears in the treated liquid.

The apparatus may, of course, be employed for treating liquids other than water, it being then important that suitable materials of construction are employed. Thus, the cement used for holding the gravel 28 and 30 in place in the modification shown in Figs. 1 and 3 must be insoluble in the liquid undergoing treatment.

When water is being treated, filter cloth consisting of cotton has been found effective and economical. When such filter cloth is employed, it is desirable to treat it so as to make it mildew and rot resistant. In place of cotton cloth other materials may be used, such as weaves of glass, wire, or resinous threads, porous rubber, etc.

While I have shown and described what I consider the preferred embodiment of my invention, modifications other than those referred to herein may be made without departing from the spirit of my invention, and reference is, therefore, made to the following claims for a definition of the scope of my invention.

What I claim is:

1. A liquid treatment cartridge comprising a container having a cylindrical impervious wall, foraminous means at one end of said container, the other end being open, a tubular filter element comprising a portion fitted over said cylindrical wall and another portion extending over and closing said open end, said first named portion being fastened to said container adjacent said first named end, means on said impervious wall to space at least part of said filter element from said wall to form drainage means between said filter element and said wall communicating with said open end, and granular liquid treatment material within said container confined between said foraminous means and said other portion of said filter element covering said open end.

2. A liquid treatment cartridge comprising a container having a cylindrical wall made of impervious material, foraminous means at one end of said container, the other end being open, a tubular filter element comprising a portion fitted over said cylindrical wall and another portion extending over and closing said open end, said first named portion being fastened to said container adjacent said first named end, means on the impervious material of said cylindrical wall to space at least part of said filter element from said cylindrical wall to form drainage means between said filter element and said cylindrical wall, a plurality of ports in said cylindrical wall adjacent said open end and establishing communication between said drainage means and the inside of said container, and granular liquid treatment material within said container confined between said foraminous means and said other portion of said filter element covering said open end.

3. A liquid treatment cartridge comprising a container having a cylindrical impervious wall, foraminous means at one end of said container, the other end being open, a tubular filter element comprising a portion fitted over said cylindrical wall and another portion extending over and closing said open end, said first named portion being fastened to said container adjacent said first named end, fine gravel cemented to the outside of said cylindrical wall on an area beginning adjacent to said first named end and extending to said open end and spacing at least part of said filter element from said wall to form drainage means between said filter element and said wall communicating with said open end, and granular liquid treatment material within said container confined between said foraminous means and said other portion of said filter element covering said open end.

4. A liquid treatment cartridge comprising a container having a cylindrical wall made of impervious material, foraminous means at one end of said container, the other end being open, a tubular filter element comprising a portion fitted over said cylindrical wall and another portion extending over and closing said open end, said first named portion being fastened to said container adjacent said first named end, flutes in said cylindrical wall providing shallow flow passages on the outside of said cylindrical wall extending from adjacent said first named end to said open end and forming an underdrain for said filter element, and granular liquid treatment material within said container confined between said foraminous means and said other portion of said filter element covering said open end.

5. A liquid treating apparatus comprising a container open at its top portion, an inwardly extending shoulder adjacent said top portion, connections for admitting and withdrawing liquid below and above said shoulder respectively, a liquid treatment cartridge having an outwardly extending flange engaging said shoulder in liquid-tight relationship, a removable cover for said top portion, an annular sleeve extending on the inside of said container from said cover to said cartridge flange, passage means through said sleeve establishing communication between said cartridge and the one of said connections located above said shoulder, said cartridge having a cylindrical wall made of impervious material, a foraminous element at its top, and a pervious bottom, a tubular filter element fitted over said cylindrical wall and being fastened to said wall, said filter element extending over said pervious bottom, port means in said cartridge adjacent said bottom, means on said impervious wall to space at least part of said filter element from said wall to form drainage means between said filter element and said wall communicating with said port means, and granular liquid treatment material within said cartridge confined by said foraminous element and the portion of said filter element extending over said pervious bottom.

6. A liquid treatment cartridge comprising a container having a cylindrical wall made of impervious material, a foraminous element at its top, and a pervious bottom, a tubular filter element fitted over said cylindrical wall and being fastened to said container, said filter element extending over said pervious bottom, means on said cylindrical wall to space at least part of said filter element from said wall to form drainage means between said filter element and said wall communicating with said pervious bottom, and granular liquid treatment material within said container confined by said foraminous element and the portion of said filter element extending over said pervious bottom.

7. A liquid treating apparatus comprising a container open at its top portion and having a shoulder adjacent said top portion, connections for admitting and withdrawing liquid below and above said shoulder, respectively, a liquid treatment cartridge having an outwardly extending flange engaging said shoulder in liquid-tight relationship, removable means for covering said top portion, said removable means having a flat face engaging said cartridge flange and also having passage means establishing communication between said cartridge and said connection for withdrawing liquid, said cartridge having a cylindrical wall made of impervious material, a foraminous element at its top, and a pervious bottom, a tubular filter element fitted over said cylindrical wall and being fastened to said wall, said filter element extending over said pervious bottom, means on said cylindrical wall to space at least part of said filter element from said wall to form drainage means between said filter element and said wall communicating with said pervious bottom, and granular liquid treatment material within said cartridge confined by said foraminous element and the portion of said filter element extending over said pervious bottom.

ERIC PICK.

REFERENCES CITED

The following references are of record in the file of this patent:

UNITED STATES PATENTS

| Number | Name | Date |
| --- | --- | --- |
| 1,055,636 | Henderson | Mar. 11, 1923 |
| 1,367,324 | Probst | Feb. 1, 1921 |
| 2,076,935 | Burkhalter | Apr. 13, 1937 |